March 11, 1952   R. J. WHITE   2,588,351
VEHICULAR HEATING APPARATUS
Filed Jan. 7, 1948   2 SHEETS—SHEET 1
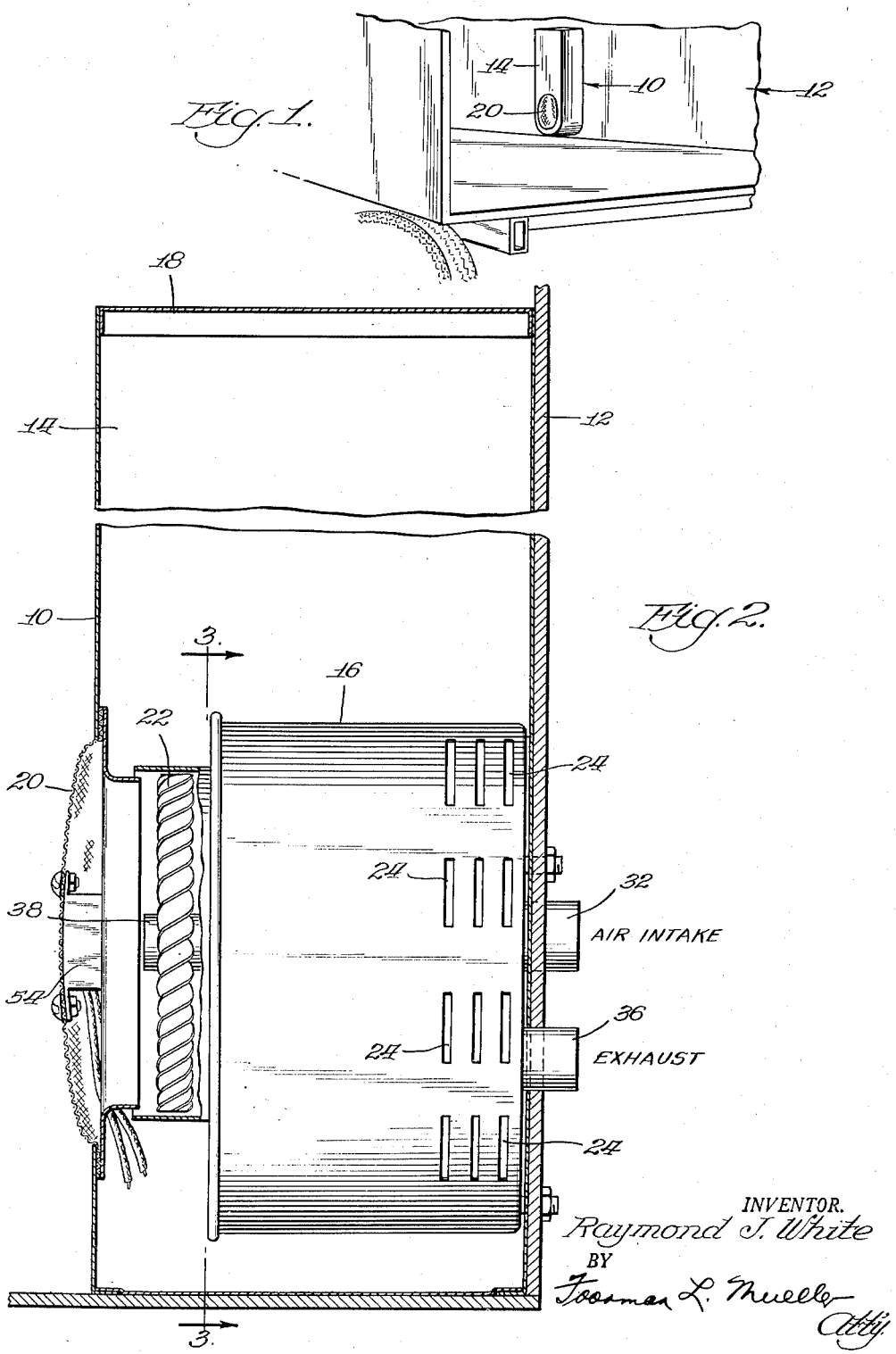
INVENTOR.
Raymond J. White
BY
Foorman L. Mueller
Atty.

March 11, 1952 R. J. WHITE 2,588,351
VEHICULAR HEATING APPARATUS
Filed Jan. 7, 1948 2 SHEETS—SHEET 2
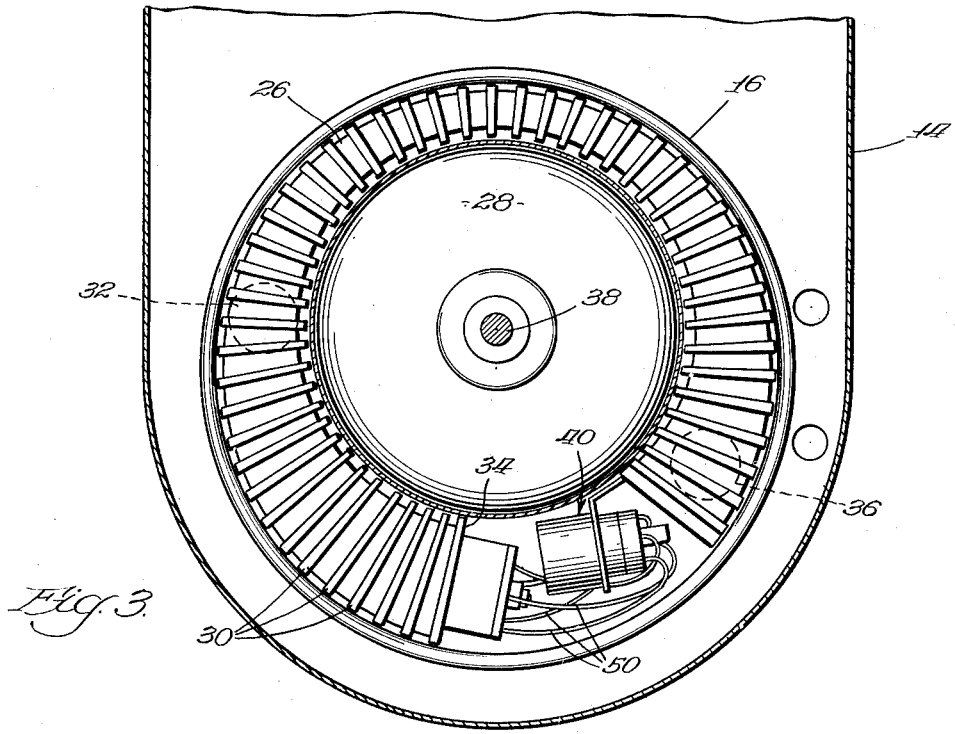
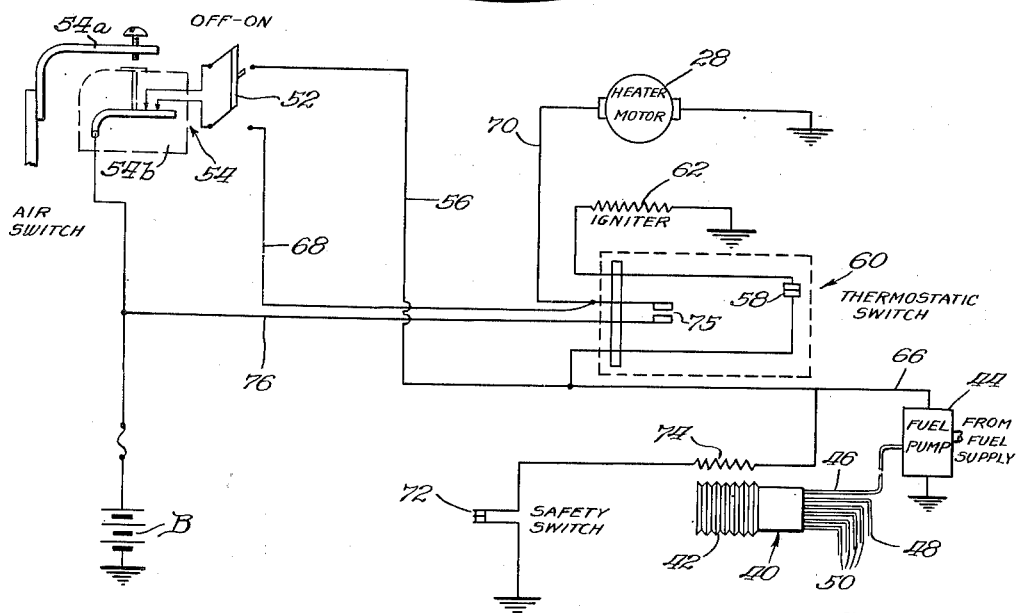
INVENTOR.
Raymond J. White
BY
Foorman L. Mueller
Atty.

Patented Mar. 11, 1952

2,588,351

UNITED STATES PATENT OFFICE 2,588,351

VEHICULAR HEATING APPARATUS

Raymond J. White, Chicago, Ill., assignor to Motorola, Inc., Chicago, Ill., a corporation of Illinois Application January 7, 1948, Serial No. 1,017

2 Claims. (Cl. 236—11)

This invention relates broadly to air heaters and control devices therefor. It is particularly, though not exclusively, applicable to what are known as "cargo heaters" for maintaining perishable goods in transit at safe storage temperatures.

The safe transportation of perishable goods during cold weather requires that the cargo be maintained at a temperature above freezing, yet low enough to prevent spoilage. Usually a temperature range between 35 degrees and 55 degrees Fahrenheit is preferred. It is advisable also to keep the air within the storage space in forced circulation during as great a portion of the time as possible. Because of these conditions, special problems are encountered in equipping trucks, trailers and other general-purpose vehicles with suitable heating systems to protect their cargoes.

Thermostatic controls have been available for turning on a heater at the lower limit of a given air temperature range and turning the heater off when the air temperature reaches the upper limit of the range, with the heater operating at full capacity between these limits. Where this simple type of on-off control is employed on a cargo heater, however, the heater must frequently be started and stopped to prevent the alternate freezing and overheating of the perishable goods. A cargo heater which operates intermittently does not usually give satisfactory results. It fails to provide uniform heat distribution and good air circulation, and is apt to involve an excessive amount of upkeep.

An object of the present invention is to provide an improved thermostatically-controlled heater adapted for substantially continuous operation to maintain an optimum air temperature, for example, 45 degrees Fahrenheit, even under extreme conditions of operation.

A further object is to provide an improved thermostatic control for a cargo heater or the like capable of varying the rate at which heat is generated so as to keep the air temperature well within the limits of a given temperature range, say 35 degrees to 55 degrees Fahrenheit.

A still further object is to provide a novel, automatic, heater control apparatus which combines a graduated control for maintaining an optimum temperature within a given temperature range (35 degrees to 55 degrees Fahrenheit) with an on-off control for checking temperature excursions outside of that range.

A feature of this invention consists in regulating the heater output automatically so that maximum heat is furnished at the lower limit of the permissible temperature range (35 degrees Fahrenheit) and minimum heat is produced to compensate for heat losses when the air temperature is between the optimum storage temperature (45 degrees Fahrenheit) and the upper limit (55 degrees Fahrenheit) of the range. Between the lower limit and the optimum temperature the heater output is variable in increments depending upon the deviation of the air temperature from the optimum value. This serves to minimize the effect of thermal inertia and thereby prevents erratic fluctuation of the air temperature within the storage space.

As a further feature, I arrange an additional automatic control for turning off the heater altogether if the air temperature should rise above the upper limit of the range. Thereafter, the heater will not resume operation until the temperature falls to the lower limit of the range, whereupon the aforesaid variable control again takes effect.

Whenever in the specification and claims hereinafter reference is made to "initiating" or "interrupting" the operation of the heater, or equivalent terminology is employed, these expressions should be construed in a broad sense to denote that the heater is rendered capable of furnishing a substantial or an insignificant heat output, as the case may be.

For a better understanding of the invention reference is had to the following detailed description thereof taken in conjunction with the accompanying drawings, wherein:

Fig. 1 is a perspective view of a cargo heater mounted on the interior of a truck or trailer, in accordance with the invention;

Fig. 2 is a vertical sectional view of a heater unit which embodies the principles of the invention;

Fig. 3 is a vertical section taken on the line 3—3 in Fig. 2; and

Fig. 4 is a circuit diagram of the apparatus.

As disclosed more fully hereinafter, I equip a fuel-burning cargo heater with two thermostatic controls, one for the purpose of maintaining the circulating air temperature at a constant optimum value (say 45 degrees) and the other to shut off the heater or turn it on, as the case may be, when the air temperature departs from the optimum value beyond the limits of a safe temperature range (for example, 35 to 55 degrees) extending above and below the optimum value.

The first-mentioned thermostatic control includes an expansible thermal element in the form of a temperature-responsive bellows incorporated in a fuel valve selector which regulates the fuel feed to the heater. If the heater is operating while the air temperature is between the optimum value and the upper limit of the aforesaid temperature range, this control functions to maintain only a minimum heat output. If the air temperature should recede from the optimum value toward the lower limit of the range, the selector will increase the fuel feeding rate by increments, until the heater is producing its maximum output at or near the lower limit of the range. This is designed to maintain the air temperature within the safe temperature range under extreme conditions of heat dissipation. Where conditions are not so severe the fuel feed is automatically reduced accordingly. This control is in effect so long as the heat loss in the vehicle is equal to or greater than the minimum output of the heater.

In the event the heat loss of the vehicle is smaller than the minimum output of the heater, the second-mentioned thermostatic control becomes effective (when the air temperature reaches the upper limit of the range) to stop the supplying of fuel to the heater. This second control is a snap-action type of thermal switch, and once opened, it remains open until the temperature again drops to the lower limit of the range, whereupon it closes and permits the fuel feed to be resumed.

Referring to Fig. 1 of the drawings, the cargo heater unit 10 illustrated therein is shown mounted on a side wall of a truck or trailer 12. The heater unit 10, as shown more particularly in Fig. 2, has a casing or shroud 14 enclosing an internal combustion heater 16. Preferably the heater 16 is constructed as disclosed in the co-pending application of Robert Dusek and Stanley J. Budlane, Serial No. 695,478, filed September 7, 1946. It should be understood, however, that any equivalent heater may be employed in lieu thereof, insofar as the present invention is concerned. The casing 14 extends upwardly from the heater 16 and is open on top. If desired, a guard 18 may be fastened on the upper end thereof, as shown in Fig. 2, to prevent any articles from dropping down into contact with the heater 16. An air intake opening near the base of the casing 14 is covered by a grille or wire mesh 20. Air from the interior of the vehicle 12 is drawn in through the grille 20 by an air circulating fan 22, which is part of the heater structure. After being heated, the air is discharged through suitable openings 24 in the housing of the heater 16 and passes upwardly out of the casing 14 toward the roof of the vehicle. A continual air circulation is maintained by the fan 22 so long as the heater 16 is in operation.

As shown best in Fig. 3, the heater 16 has an approximately C-shaped combustion chamber 26 which partially surrounds an electric motor 28 that drives the air circulating fan 22 (Fig. 2). The chamber 26 has heat-radiating fins 30 integral therewith or secured thereto. Air is drawn into the combustion chamber 26 through an air intake duct 32 that extends through the wall of the vehicle 12. The air receives a certain amount of prewarming, then is admitted to the combustion chamber 26 near the inlet end 34 thereof. Fuel is admitted to the combustion chamber 26 along with the air, in a manner to be explained, and the combustible mixture is ignited. The products of combustion traverse the chamber 26 and are exhausted through a duct 36 that extends through the side wall of the vehicle 12. A suction exhaust fan (not shown), mounted on the end of the motor shaft 38 opposite the end thereof on which the air circulating fan 22 is mounted, propels the spent products of combustion through the exhaust opening. The exhaust duct 36, of course, can be led beneath or to the rear of the vehicle body if desired or required.

The heater 16 is equipped with control devices and valve means for admitting fuel to the combustion chamber 26 at a variable rate dependent upon temperature requirements. Preferably the heater 16 includes a plurality of main burners associated with a pilot burner, as disclosed in the aforesaid Dusek and Budlane application, and is provided with a multiple fuel valve selector unit 40 such as is disclosed and claimed in the copending application of Stanley J. Budlane, Serial No. 644,693, filed February 1, 1946. This selector unit 40, as shown schematically in Fig. 4, includes an expansible thermal element in the form of a bellows 42 filled with a fluid such as sulphur dioxide having a relatively high temperature coefficient of expansion and contraction. The selector unit 40 is positioned between the ends of the C-shaped combustion chamber 26, as shown in Fig. 3, and is heat-insulated from the combustion chamber. The bellows 42 is responsive to the temperature of air entering the heater 16.

Fuel furnished by a pump 44 flows through a fuel intake line 46 to the selector 40, a suitable pressure regulator (not shown) generally being provided in this line. The selector 40 communicates through a fuel line 48 with the pilot burner of the heater 16, and through fuel lines 50 with the main burners of the heater 16. The fuel lines 50 are controlled respectively by fuel valves which are actuated by the bellows 42 in a selective manner depending upon temperature conditions. Details of the valves and the valve-operating mechanism are not included herein because they are merely incidental to the present invention, but a more complete understanding thereof may be obtained by referring to the aforesaid Budlane application.

The control circuit of the heater unit 10 includes a manual off-on switch 52 and a thermostatic air switch 54. The air switch 54 includes a bimetallic arm 54a engaging a snap-action microswitch 54b, and is disposed in the air intake opening of the heater 10, being mounted on the inside of the grille 20. This switch 54 is adapted to change abruptly between its open and closed positions when the air temperature to which it is exposed either rises above the upper limit of a predetermined temperature range or descends below the lower limit of such range. In the present instance, the switch 54 opens if the air temperature equals or exceeds 55 degrees Fahrenheit. Thereafter the switch 54 remains open until the air temperature falls to 35 degrees Fahrenheit, whereupon it closes and remains closed until the air temperature should again rise above 55 degrees.

Whenever the air switch 54 closes (assuming that the switch 52 is closed and the heater 16 is cold) a circuit is completed from a battery B through switches 54 and 52, conductor 56 and contacts 58 of a thermostatic switch 60 to an igniter 62 in the pilot burner of the heater 16. The switch 60 is disposed in the heater 16 so as to be affected by the heat from the combustion chamber 26. For example, it may be mounted directly on the exterior of the chamber 26 in heat-conductive relation thereto. When the chamber 26 is cold, the contacts 58 of the switch 60 are closed. Thus, closure of the air switch 54, occasioned by a drop in air temperature to 35 degrees Fahrenheit, results in energization of the igniter 62, causing the fuel in the pilot burner to be ignited. All of the main burners whose fuel valves are open at this time also are ignited by the pilot burner.

The selector 40 is so arranged that all of the fuel valves are open at 35 degrees Fahrenheit, so that a maximum rate of fuel feed is produced at that temperature. The fuel is supplied by the pump 44 which, in the illustrated embodiment, is electrically operated and is energized by the battery B through a circuit comprising the switches 54 and 52 and conductors 56 and 66. The heater motor 28 is included in a circuit which extends from the battery B through the switches 54 and 52 and conductors 68 and 70 as shown.

The heater 16 preferably is provided with some sort of safety control such as, for example, the one disclosed and claimed in the copending application of Stanley J. Budlane, Serial No. 2,685, filed January 16, 1948. A thermostatic safety switch 72 is mounted on the heater frame in heat transfer relation to the combustion chamber 26. The switch 72 maintains its contacts closed when the combustion chamber is cold, thereby completing a circuit for energizing an electric heating element 74 disposed adjacent to the bellows 42, whenever the switches 54 and 52 are closed. If combustion fails to occur within the chamber 26, the heating element 74 ultimately heats the bellows 42 to an extent sufficient for closing all of the fuel valves in the fuel lines 50, the bellows 42 being so arranged that expansion thereof closes the valves progressively while contraction thereof progressively opens the valves. However, if combustion is initiated, the switch 72 opens in response to the heat from the combustion chamber 26, and the circuit through the heating element 74 is broken, thus enabling the bellows 42 to operate solely in response to air temperature.

The bellows 42 functions with reference to a predetermined optimum temperature of 45 degrees Fahrenheit. When the air temperature reaches its optimum value, the fuel feed is reduced so that only a minimum heat output (4,000 B. t. u.) is produced by the heater. When the air temperature is at or near 35 degrees Fahrenheit, the maximum heat output (18,000 B. t. u.) is produced. As the air temperature rises from 35 degrees to 45 degrees, the heat output gradually is reduced by the selector 40 from the maximum value to the minimum value. This feature is designed to prevent the building up of surplus heat within the storage space, thereby keeping the air temperature within the range of 35 to 55 degrees, so that the heater tends to function continuously rather than intermittently.

If the air temperature should continue to rise above 45 degrees, the minimum heat output is maintained until the air temperature reaches 55 degrees. Thereupon the switch 54 snaps open and breaks the circuit for the fuel pump 44, interrupting the operation of the heater. The thermostatic switch 60 has contacts 75 which close when the combustion chamber 26 is hot, and remain closed for a period of time after the heater has been cut off. By this means the electric circuit energizing fan motor 28, is maintained closed, and a supply of air is provided for purging the heater after the same has been cut off. This circuit extends from the battery B through a conductor 76, the contacts 64 and the conductor 70 leading to the motor 28. Hence, the motor 28 continues to drive the exhaust fan of the heater until the combustion chamber 26 cools and the thermostatic switch contacts 75 open, thereby scavenging the combustion chamber 26 during this interval.

The igniter 62 is automatically disconnected as an incident to the heating of the combustion chamber 26 and consequent opening of the thermostatic switch contacts 58. When the chamber 26 cools again, the contacts 58 close, thereby conditioning the igniter 62 for energization when the switches 54 and 52 are closed.

From the above description it will be appreciated that I have provided a fully automatic, thermostatically-controlled cargo heater which is adapted to maintain the temperature of air in an enclosed storage space at or near an optimum storage temperature of 45 degrees Fahrenheit. Under most conditions of service the heater will operate continually, keeping the air in circulation and maintaining uniform temperature within the enclosure. This is a great advantage as compared with prior on-off types of thermostatic control which caused the heater to operate intermittently and gave rise to poor heat distribution and maintenance problems. The heater is automatically switched off only under conditions when the heat lost from the vehicle is less than the minimum heat which the heater is capable of producing. The electrical components of the heater are operable from the conventional vehicle storage battery so that the storage space can be heated even though the vehicle engine is not operating. Other advantageous features will occur to those skilled in the art.

While a preferred embodiment of the invention has been disclosed herein, such embodiment is capable of modification without departing from the spirit of the invention, and it is intended that all such modifications be covered by the appended claims.

I claim:

1. A control system for fuel burning apparatus for heating a space, said control system causing operation of said apparatus when the temperature within said space falls below a first value and causes operation of the heating apparatus until the temperature within said space exceeds a second value greater than said first value, said control system including in combinatin, means for supplying fuel to said heating apparatus, an air temperature responsive device controlling said fuel supplying means and arranged to supply fuel to said heating apparatus when the temperature of the space falls below said first value and to stop the supply of fuel when the temperature in said space exceeds said second value, an expansible thermal sensitive element responsive to the temperature of the space being heated, a fuel selector valve controlling the supply of fuel from said fuel supplying means to said heating apparatus and operatively connected to said expansible thermal sensitive element for regulating the supply of fuel to said heating apparatus to maintain the temperature of the space being heated at a selected value intermediate said first and second values, a heating element physically disposed adjacent said thermal sensitive element and controlling said thermal sensitive element for cutting off the supply of fuel to said heating apparatus should burning fail to occur therein, and a thermal operated safety device controlling the energization of said heating element.

2. In a fuel-burning heater apparatus adapted to maintain an enclosed body of air approximately at an optimum temperature for the safe storage of perishable goods during cold weather, an expansible thermal sensitive element responsive to the air temperature, a fuel selector valve actuated directly by said thermal sensitive element for regulating the rate at which fuel is fed to said heater, said selector valve being arranged to produce a minimum output of said heater when the air temperature is at said optimum temperature and to permit increasingly greater flow of fuel to said heater as the air temperature drops below said optimum temperature, a casing for enclosing and supporting all of the above-mentioned parts, a snap-action thermal sensitive switch supported by said casing and responsive to the air temperature, electrically operated fuel supply means, electrical circuit means including said switch and said fuel supply means whereby said switch controls said fuel supply means, said switch being arranged to interrupt the supply of fuel to the heater when the air temperature exceeds said optimum temperature by more than a predetermined amount and to permit the feeding of fuel to the heater only when the air temperature thereafter drops below said optimum temperature by more than a given amount, and a safety device including said expansible thermal sensitive element, heating means therefor, and thermostatic means responsive to the temperature of the heater for energizing said heating means, said heating means being energized through said thermostatic means to control said thermal sensitive element for cutting off the supply of fuel to said heater in the event of failure of burning therein.

RAYMOND J. WHITE.

REFERENCES CITED

The following references are of record in the file of this patent:

UNITED STATES PATENTS

| Number | Name | Date |
|---|---|---|
| 1,600,568 | Smith | Sept. 21, 1926 |
| 1,918,265 | Hartwig | July 18, 1933 |
| 2,076,768 | Denison | Apr. 13, 1937 |
| 2,245,773 | Grant | June 17, 1941 |
| 2,262,823 | Stearns | Nov. 18, 1941 |
| 2,262,825 | Welliver | Nov. 18, 1941 |
| 2,292,830 | Gauger | Aug. 11, 1942 |